United States Patent
Cheng et al.

(10) Patent No.: US 11,082,597 B2
(45) Date of Patent: Aug. 3, 2021

(54) ELECTRONIC DEVICE AND CAMERA MODULE WITH ANTI-SHAKE ASSEMBLY

(71) Applicant: BEIJING XIAOMI MOBILE SOFTWARE CO., LTD., Beijing (CN)

(72) Inventors: Chihyi Cheng, Beijing (CN); Liangming Zhang, Beijing (CN); Yan Zheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/792,240

(22) Filed: Feb. 15, 2020

(65) Prior Publication Data

US 2021/0112185 A1  Apr. 15, 2021

(30) Foreign Application Priority Data

Oct. 10, 2019  (CN) .......................... 201921694341.8

(51) Int. Cl.
*H04N 5/225* (2006.01)
*G03B 17/56* (2021.01)

(52) U.S. Cl.
CPC ......... *H04N 5/2257* (2013.01); *G03B 17/566* (2013.01); *H04N 5/2253* (2013.01); *H04N 5/2254* (2013.01)

(58) Field of Classification Search
CPC .. H04N 5/2257; H04N 5/2254; H04N 5/2253; G03B 17/566
See application file for complete search history.

(56) References Cited

U.S. PATENT DOCUMENTS

| 9,164,292 | B2 | 10/2015 | Brooke | |
| 2008/0238249 | A1* | 10/2008 | Takahashi | H02N 2/108 |
| | | | | 310/317 |
| 2011/0292217 | A1* | 12/2011 | Ohta | H04N 5/225 |
| | | | | 348/169 |
| 2014/0125824 | A1 | 5/2014 | Takizawa | |
| 2016/0014309 | A1* | 1/2016 | Ellison | H04N 5/2251 |
| | | | | 248/550 |
| 2017/0075351 | A1* | 3/2017 | Liu | H04N 5/2251 |
| 2018/0255247 | A1* | 9/2018 | Ristroph | H04N 5/2328 |
| 2019/0260943 | A1* | 8/2019 | Strobert, Jr. | H04N 5/2328 |

OTHER PUBLICATIONS

Extended European Search Report for EP application 20162085.3, dated Oct. 2, 2020.

* cited by examiner

*Primary Examiner* — Gevell V Selby
(74) *Attorney, Agent, or Firm* — Syncoda LLC; Feng Ma

(57) ABSTRACT

A camera module includes a fixed bracket, a camera body and an anti-shake assembly. The camera body includes a lens and an imaging sensor corresponding to the lens. The camera body is provided with a movable connecting member on an external side surface thereof arranged along a circumferential direction of the lens, the fixed bracket is provided with a movable fitting member corresponding to the movable connecting member, and the movable fitting member is movably connected with the movable connecting member. The anti-shake assembly includes a space attitude sensor and a driving module electrically connected with the space attitude sensor. The driving module is configured to be fitted with the camera body and to drive the camera body to perform an anti-shake motion relative to the fixed bracket according to shaking information obtained by the space attitude sensor.

20 Claims, 6 Drawing Sheets

ELECTRONIC DEVICE AND CAMERA MODULE WITH ANTI-SHAKE ASSEMBLY

CROSS-REFERENCE TO RELATED APPLICATION

This application claims priority to Chinese Patent Application No. 201921694341.8, filed on Oct. 10, 2019, the disclosure of which is hereby incorporated by reference in its entirety.

BACKGROUND

An anti-shake function of an electronic device such as a mobile phone can improve an image capturing quality of a camera module in use. When an anti-shake assembly realizes the anti-shake function by regulating a relative position relationship between a lens and an imaging sensor, an imaging effect of an edge of an image and an overall image capturing quality of the camera module will be reduced. Nevertheless, an anti-shake manner that takes both the imaging effect and the anti-shake effect into account needs to improve the anti-shake assembly, which causes an excessive occupation of an inner space of the electronic device.

SUMMARY

The disclosure relates generally to a field of electronic technologies, and more particularly to a camera module and an electronic device.

According to a first aspect of the present disclosure, a camera module is provided, and includes a fixed bracket, a camera body and an anti-shake assembly. The camera body includes a lens and an imaging sensor corresponding to the lens in terms of positions. The camera body is provided with a movable connecting member on an external side surface of the camera body arranged along a circumferential direction of the lens, the fixed bracket is provided with a movable fitting member corresponding to the movable connecting member in terms of positions, and the movable fitting member is movably connected with the movable connecting member.

The anti-shake assembly includes a space attitude sensor and a driving module electrically connected with the space attitude sensor. The driving module is configured to be fitted with the camera body and to drive the camera body to perform an anti-shake motion relative to the fixed bracket according to shaking information obtained by the space attitude sensor.

According to a second aspect of the present disclosure, an electronic device is provided. The electronic device includes a device body and a camera module. The camera module is assembled to the device body. The camera module includes a fixed bracket, a camera body and an anti-shake assembly. The fixed bracket is assembled and fitted with the fixed member of the device body. The camera body includes a lens and an imaging sensor corresponding to the lens in terms of positions. The camera body is provided with a movable connecting member on an external side surface of the camera body arranged along a circumferential direction of the lens, the fixed bracket is provided with a movable fitting member corresponding to the movable connecting member in terms of positions, and the movable fitting member is movably connected with the movable connecting member. The anti-shake assembly includes a space attitude sensor and a driving module electrically connected with the space attitude sensor. The driving module is configured to be fitted with the camera body and to drive the camera body to perform an anti-shake motion relative to the fixed bracket according to shaking information obtained by the space attitude sensor.

It should be understood that the above general description and the detailed description below are merely used to explain the present disclosure, and cannot be construed as a limitation to the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
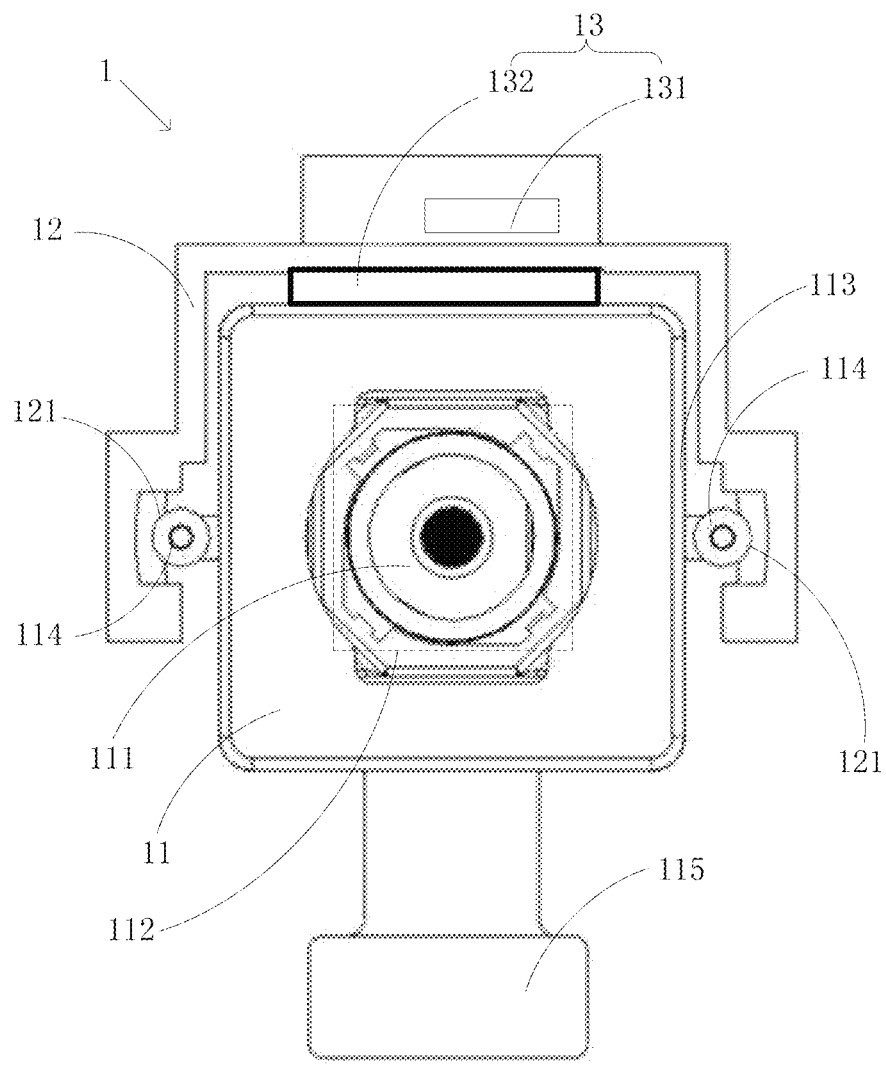
FIG. 1 is a schematic view of a camera module in some embodiments of the present disclosure.

FIG. 1 is a schematic view of a camera module in some embodiments of the present disclosure. As illustrated in FIG. 1, the camera module 1 includes a fixed bracket 12, a camera body 11 and an anti-shake assembly 13. The camera body 11 includes a lens 111 and an imaging sensor 112 corresponding to the lens 111 in terms of positions. The camera body 11 is provided with a movable connecting member 114 on an external side surface 113 arranged along a circumferential direction of the lens 111, and the fixed bracket is provided with a movable fitting member 121 corresponding to the movable connecting member 114 in terms of positions. The movable fitting member 121 is movably connected with the movable connecting member 114. The anti-shake assembly 13 includes a space attitude sensor 131 and a driving module 132 electrically connected with the space attitude sensor 131. The driving module 132 is configured to be fitted with the camera body 11 and to drive the camera body 11 to perform an anti-shake motion relative to the fixed bracket 12 according to shaking information obtained by the space attitude sensor 131.

Since a current working position of the camera body 11 changes with respect to an original working position during shaking of the camera module 1, the imaging effect of the camera body 11 will be affected. Therefore, the anti-shake motion of the camera body 11 with respect to the fixed bracket 12 means a compensation motion in which a posture of the camera body 11 with respect to the fixed bracket 12 is regulated according to the overall shaking information of the camera module 1, so as to maintain the current working position of the camera body 11 in the original working position.

It should be noted that the space attitude sensor 131 may be a gyroscope or other devices for sensing a space attitude of the camera module 1, which is not limited in the present disclosure. The space attitude sensor 131 may be arranged to the fixed bracket 12, or the camera module 1 or other fixed parts of the electronic device 2 assembled with the camera module 1, so as to sense the overall shaking information of the camera module 1. The present disclosure does not limit an arrangement position of the space attitude sensor 131.

When the space attitude sensor 131 of the anti-shake assembly 13 senses the shaking information, the driving module 132 is controlled to be fitted with the camera body 11 and to drive the camera body 11 to perform the anti-shake motion relative to the fixed bracket 12. Since the lens 111 and the imaging sensor 112 of the camera body 11 perform the anti-shake motion relative to the fixed bracket 12 as a whole, an influence of the change of the relative position relationship between the lens 111 and the imaging sensor 112 on the image quality is avoided. Additionally, in the camera module 1, the movable connecting member 114 on the external side surface 113 of the camera body 11 may be used to be movably connected with the movable fitting member 121 on the fixed bracket 12, thereby reducing a structure size and a space occupation of the camera body 11 in a thickness direction.

In the above embodiment, at least two movable connecting members 114 may be provided on the external side surface 113 of the camera body 11, which is not limited in the present disclosure. When at least two movable connecting members 114 are arranged on the external side surface 113 of the camera body 11, the stability of the fit between the camera body 11 and the fixed bracket 12 is increased by improving the number and the arrangement manner of the movable connecting members 114. An exemplary description of the arrangement manner of the movable connecting member 114 will be described as follows.

In an embodiment, as illustrated in FIG. 1, two movable connecting members 114 are arranged on the external side surface 113 of the camera body 11, and the two movable connecting members 114 are symmetrically arranged with respect to the lens 111. The camera body 11 forms the movable support at two symmetrical positions by the movable fit between the movable connection pieces 114 arranged symmetrically and the fixed bracket 12, which is conductive to improving the stability of the camera body 11 in the anti-shake motion, thus increasing a precision of the anti-shake motion and an anti-shake effect. In addition, since the camera module 1 is provided with the two movable connecting members 114 symmetrical with respect to the lens 111, a structural interference with other parts of the camera module 1 is reduced through the number and the arrangement position of the movable connecting members 114, on the premise of ensuring the stability of the connection, thus reducing the overall structure size and the space occupation of the camera module 1.

Figure 2:
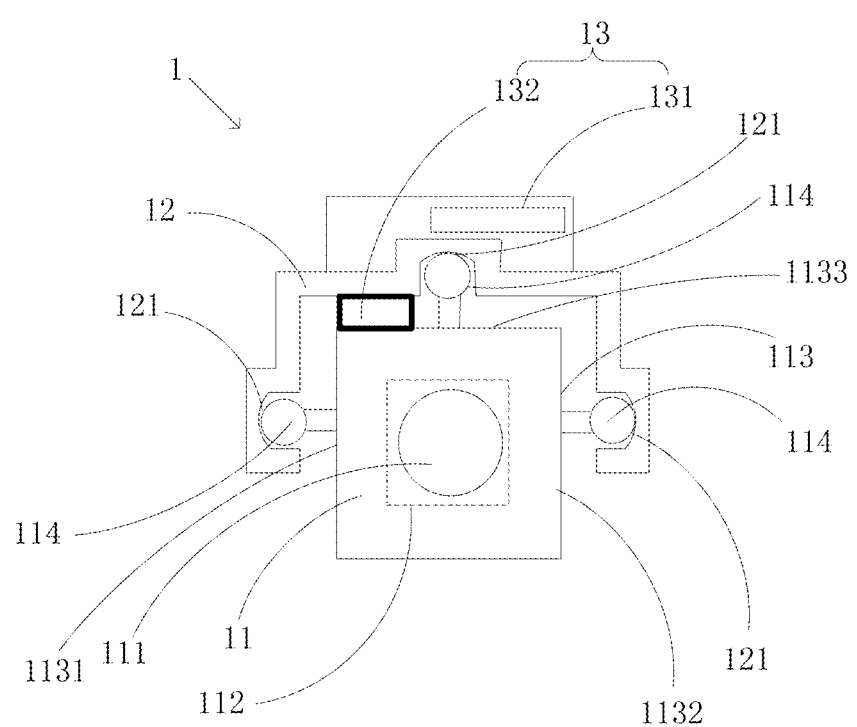
FIG. 2 is a schematic view of a camera module in some other embodiments of the present disclosure.

In another embodiment, as illustrated in FIG. 2, three movable connecting members 114 are provided on the external side surface 113 of the camera body 11 so as to generate a movable connection effect of a three-point fit with the fixed bracket 12, thereby further improving the stability of the fit between the camera body 11 and the fixed bracket 12. The three movable connecting members 114 may be uniformly distributed on the external side surface 113, or may also be distributed in a preset vacancy of the camera body 11 according to a structural arrangement of the camera body 11 and the fixed bracket 12, so as to avoid a structural interference of the movable connecting member 114 with other components of the camera body 11 and the fixed bracket 12. When a plurality of movable connecting members 114 are arranged on the external side surface 113 of the camera body 11, the present disclosure does not limit arrangement positions of the plurality of movable connecting members 114.

As illustrated in FIG. 1 and FIG. 2, the fixed bracket 12 may be a continuous structure on which the movable fitting member 121 in one-to-one correspondence with the movable connecting member 114 is arranged, so as to improve an integration of the camera module 1 as well as facilitate the structural arrangement and the mounting of the fixed bracket 12. Taking a cross section of the camera body 11 having a rectangle shape for example, the fixed bracket 12 may be a door-frame structure matched with the external side surface 113 of the camera body 11, such that a circuit board 115 and other structures of the camera module 1 may extend out of an opening of the door-frame structure, so as to avoid a structural interference between the camera module 1 and the fixed bracket 12. According to a using habit of the camera body 11 in an image capturing process, the external side surface 113 of the camera body 11 is defined to include a left side surface 1131, a right-side surface 1132, a top side surface 1133 and a top side surface. The movable connecting members 114 may be symmetrically arranged on the left side surface 1131 and the right-side surface 1132 of the camera body 11, and the movable fitting members 121 are correspondingly arranged on a left side and a right side of the door-frame structure. In an assembling process, the assembling and the fitting of the camera body 11 and the fixed bracket 12 of the door type may be finished respectively, thus facilitating the structural arrangement and the mounting of the fixed bracket 12.

Figure 3:
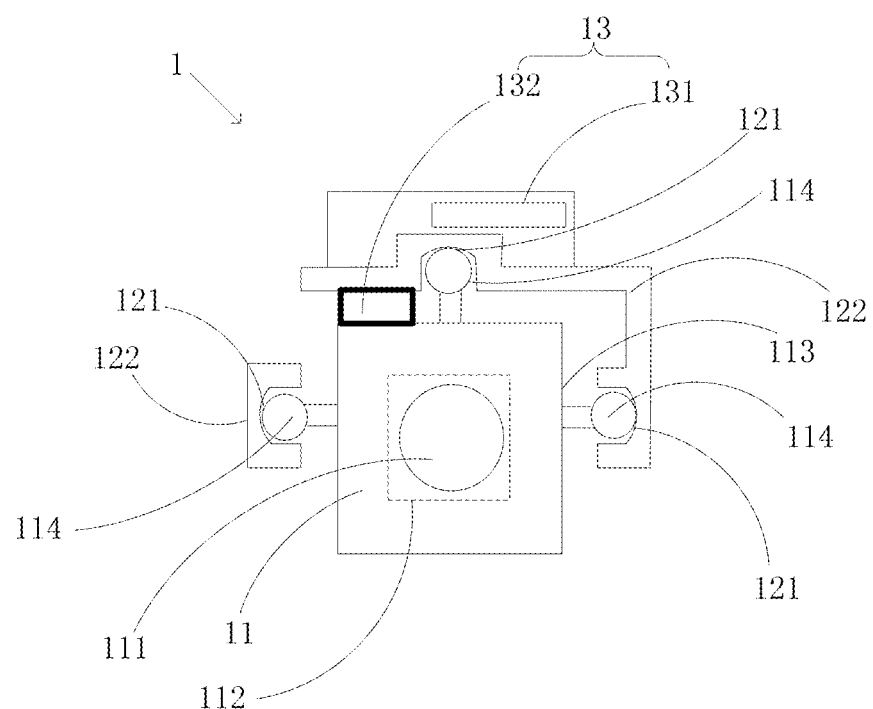
FIG. 3 is a schematic view of a camera module in yet some other embodiments of the present disclosure.

Alternatively, as illustrated in FIG. 3, a plurality of movable connecting members 114 are provided, the fixed bracket 12 may include bracket parts 122 arranged at intervals, and an arrangement position of the bracket part 122 corresponds to that of at least one of the plurality of movable connecting members 114. Dividing the fixed bracket 12 into the bracket parts 122 arranged independently may not only improve an arrangement flexibility of the fixed bracket 12, but also effectively utilize the scattered assembling space inside the electronic device 2 and hence improve a utilization of the inner space of the electronic device 2. One bracket part 122 may be provided with one movable fitting member 121 so as to correspond to one movable connecting member 114 on the camera body 11 in terms of positions. Another bracket part 122 may also be provided with the movable fitting members 121 so as to correspond to the movable connecting members 114 on the camera body 11 in terms of positions.

In the above embodiments, one of the movable connecting member 114 and the movable fitting member 121 may be a guide wheel, and the other one thereof may be an arc-shaped guide rail, so as to drive the camera body 11 to generate the anti-shake motion around an optical axis of the lens 111 with respect to the fixed bracket 12 through a rolling of the guide wheel relative to the arc-shaped guide rail.

Alternatively, one of the movable connecting member 114 and the movable fitting member 121 is a sliding member, and the other one thereof is an arc-shaped slide rail. An arc center of the arc-shaped slide rail coincides with an optical axis of the lens, and the sliding member is slidably fitted with the arc-shaped slide rail. The sliding member may be a slide block structure matched with a cross-section shape of the arc-shaped slide rail. When the slide block slides in the arc-shaped slide rail, the slide block may drive the camera body 11 to generate the corresponding anti-shake motion around the optical axis of the lens 111 with respect to the fixed bracket 12.

The arc center of the arc-shaped guide rail coincides with the optical axis of the lens 111, such that the anti-shake motion of the camera body 11 is conducted around the optical axis of the lens 111, which facilitates the calculation and control of a motion track and helps to improve an anti-shake effect of the camera body 11.

Figure 4:
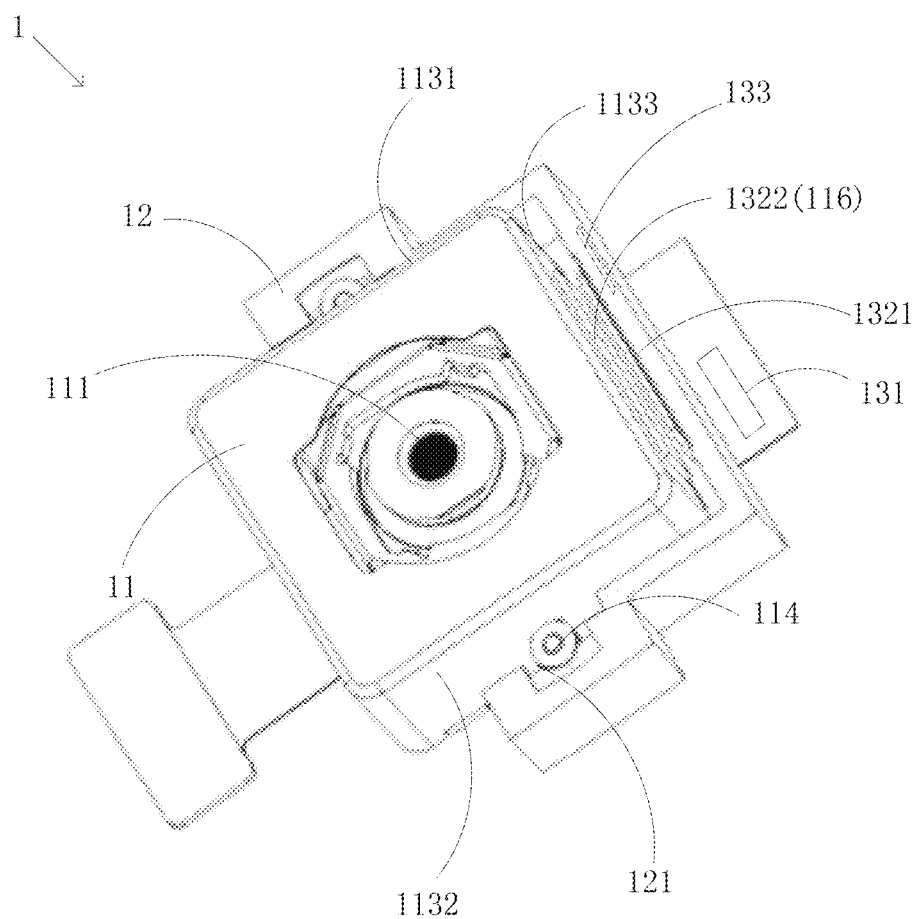
FIG. 4 is a perspective view of a camera module in some embodiments of the present disclosure.

For example, as illustrated in FIG. 4, taking an example in which the movable connecting member 114 is the guide wheel and the movable fitting member 121 is the arc-shaped guide rail, when the above camera module 1 encounters shaking in use, the space attitude sensor 131 senses the shaking information, and other control chips or a mainboard of the device receives the shaking information and controls the driving module 132 to push the camera body 11 to generate a preset displacement according to the shaking information. In this case, since the guide wheel on the camera body 11 can roll along the arc-shaped guide rail on the fixed bracket 12, the camera body 11 is driven to move along the arc-shaped guide rail, such that the shaking produced by the camera module 1 in use can be compensated and an expected anti-shake effect is achieved.

Further, the anti-shake assembly 13 further includes a feedback module 133 electrically connected with the space attitude sensor 131, and the feedback module 133 includes a Hall sensor (not marked) and a controller (not marked) electrically connected with the Hall sensor. The feedback module 133 is arranged to the fixed bracket 12 or in other fixed positions inside the electronic device 2, which is not limited in the present disclosure. The camera body 11 further includes a magnetic field generator 116, and the Hall sensor corresponds to the magnetic field generator 116 in terms of positions. When the camera body 11 is controlled to perform the anti-shake motion according to the shaking information obtained by the space attitude sensor 131, a relative position relationship between the magnetic field generator 116 arranged on the camera body 11 and the Hall sensor changes. The Hall sensor converts a current position of the magnetic field generator 116 and the camera body 11 into an electrical signal and feeds it back to the controller. The controller compares the above current position with an expected position and sends a feedback control signal to the driving module 132, such that the anti-shake motion of the camera body 11 is tracked and has an error compensation, thereby improving the anti-shake effect of the camera module 1.

It should be noted that the driving module 132 may be at least one of an electromagnetic force driving assembly and a shape-memory alloy, or a driving module 132 based on other principles, which is not limited in the present disclosure. The electromagnetic force driving assembly pushes the camera body 11 to perform the anti-shake motion through an electromagnetic force, while the shape-memory alloy pushes the camera body 11 to perform the anti-shake motion via a current passing through a wire body to raise its temperature, and hence to result in a structure change of the shape-memory alloy.

Figure 5:
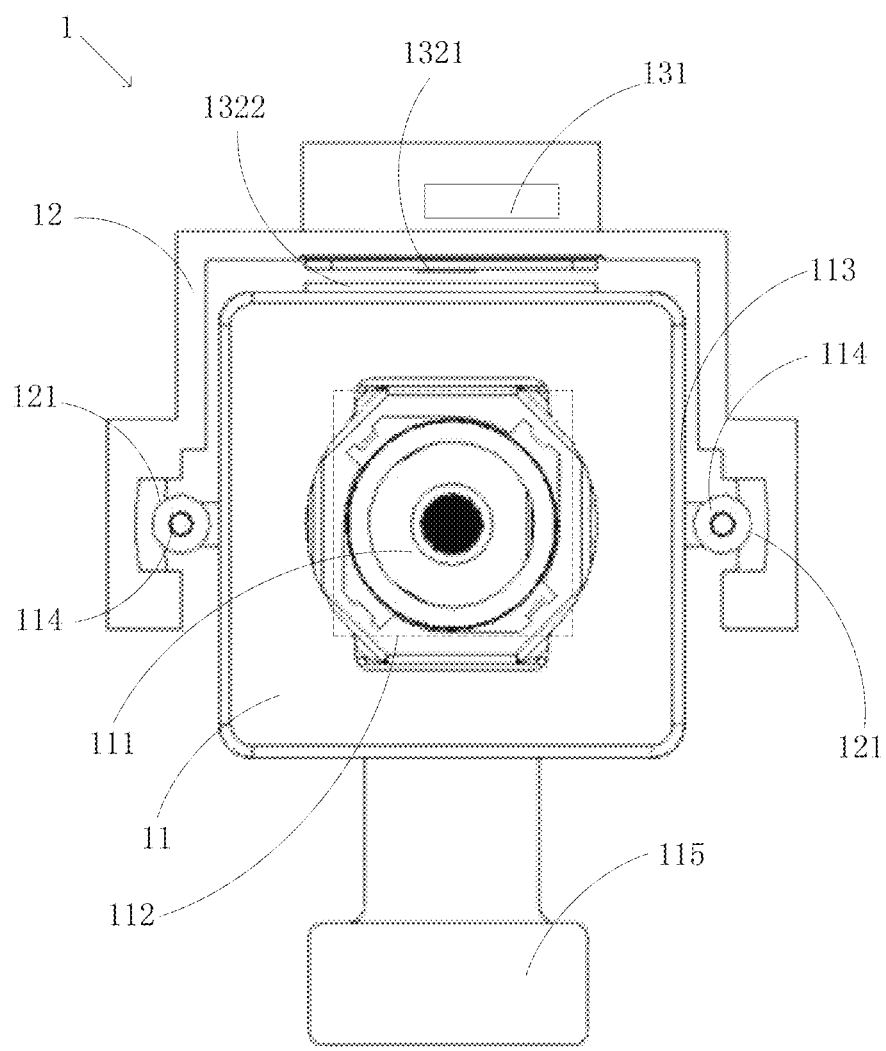
FIG. 5 is a schematic view of a camera module according to still some other embodiments of the present disclosure.

When the electromagnetic force driving assembly pushes the camera body 11 to perform the anti-shake motion through the electromagnetic force, as illustrated in FIG. 4 and FIG. 5, the electromagnetic force driving assembly includes a driving coil 1321 and a magnetic member 1322, the magnetic member 1322 is arranged on the camera body 11, and the driving coil 1321 is correspondingly arranged on the fixed bracket 12 or other fixed members of the electronic device 2. When the driving coil 1321 is powered on, a preset magnetic field is generated to drive the camera body 11 with the magnetic member 1322 to perform the anti-shake motion towards an expected position. In this case, the magnetic member 1322 may also be directly used as the magnetic field generator 116 associated with the Hall sensor, so as to simplify the structural arrangement of the camera body 11. It should be noted that both the magnetic field generator 116 and the magnetic member 1322 may be a loadstone or a magnet, which is not limited in the present disclosure.

For example, the fixed bracket 12 is a door-frame structure matched with the external side surface 113 of the camera body 11, the movable connecting members 114 are provided on the left side surface 1131 and the right side surface 1132 of the camera body 11 symmetrically, and the movable fitting members 121 are correspondingly arranged on the left side and the right side of the door-frame structure. In this case, the magnetic member 1322 may be arranged on the top side surface 1133 of the camera body 11, and the driving coil 1321 is correspondingly arranged to a top of the fixed bracket 12 of the door type, so as to avoid structure and function interferences between the magnetic member 1322, the driving coil 1321 and the movable connecting member 114, the movable fitting member 121, and also to allow the magnetic member 1322 between the two movable connecting members 114 to provide a stable pushing force for the camera body 11.

Figure 6:
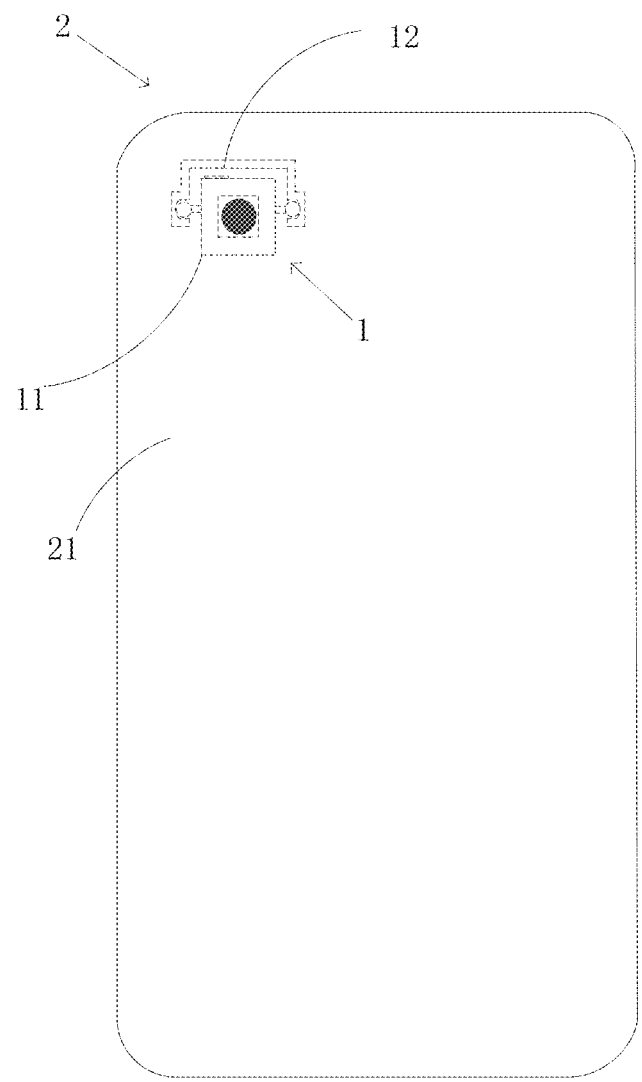
FIG. 6 is a schematic view of an electronic device in some embodiments of the present disclosure.

The present disclosure further proposes an electronic device 2, as illustrated in FIG. 6. The electronic device 2 includes a device body 21 and a camera module 1. The camera module 1 is assembled in the device body 21, and the fixed bracket 12 is assembled and fitted with a fixed member of the device body 21. The fixed member of the device body 21 may be a rear case, a middle frame or other fixed structures located in the device body 21, which is not limited in the present disclosure. The camera module 1 may act as a front camera or a rear camera of the electronic device 2, which is also not limited in the present disclosure.

It should be noted that the electronic device 2 may be a mobile phone, a tablet computer, a vehicle terminal or a medical terminal, etc., which is not limited in the present disclosure.

The camera module 1 is provided with the camera body 11 and the fixed bracket 12, and the movable connecting member 114 is provided on the external side surface 113 of the camera body 11 arranged along the circumferential direction of the lens 111, such that the movable connecting member 114 is movably connected with the movable connecting member 121 on the fixed bracket 12. When the space attitude sensor 131 of the anti-shake assembly 13 senses the shaking information, the driving module 132 is controlled to be fitted with the camera body 11 and to drive the camera body 11 to perform the anti-shake motion relative to the fixed bracket 12. Since the lens 111 and the imaging sensor 112 of the camera body 11 perform the anti-shake motion relative to the fixed bracket 12 as a whole, the influence of the change of the relative position relationship between the lens 111 and the imaging sensor 112 on the image quality is avoided. In addition, in the camera module 1, the movable connecting member 114 on the external side surface 113 of the camera body 11 may be used to be movably connected with the movable fitting member 121 on the fixed bracket 12, so as to reduce a structure size and a space occupation of the camera body 11 in a thickness direction, thus facilitating improvements of the lightness and thinness of the electronic device 2.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub combination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

Other embodiments of the present disclosure will be apparent to those skilled in the art from consideration of the specification and practice of the technical solution disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

The invention claimed is:

1. A camera module, comprising:
a fixed bracket;
a camera body comprising a lens and an imaging sensor corresponding to the lens in terms of positions, the camera body being further provided with a movable connecting member on an external side surface of the camera body arranged along a circumferential direction of the lens, the fixed bracket being provided with a movable fitting member corresponding to the movable connecting member in terms of positions, the movable fitting member being movably connected with the movable connecting member; and
an anti-shake assembly comprising a space attitude sensor and a driving module electrically connected with the space attitude sensor, the driving module is configured to be fitted with the camera body and to drive the camera body to perform an anti-shake motion relative to the fixed bracket according to shaking information obtained by the space attitude sensor,
wherein the anti-shake motion of the camera body with respect to the fixed bracket indicates a compensation motion in which a posture of the camera body with respect to the fixed bracket is regulated according to the shaking information, so as to maintain a current working position of the camera body in an original working position.

2. The camera module according to claim 1, wherein one of the movable connecting member and the movable fitting member is a guide wheel, the other one of the movable connecting member and the movable fitting member is an arc-shaped guide rail, an arc center of the arc-shaped guide rail coincides with an optical axis of the lens, and the guide wheel is rollably fitted with the arc-shaped guide rail.

3. The camera module according to claim 1, wherein one of the movable connecting member and the movable fitting member is a sliding member, the other one of the movable connecting member and the movable fitting member is an arc-shaped slide rail, an arc center of the arc-shaped slide rail coincides with an optical axis of the lens, and the sliding member is slidably fitted with the arc-shaped slide rail.

4. The camera module according to claim 1, wherein at least two movable connecting members are provided on the external side surface of the camera body.

5. The camera module according to claim 4, wherein two movable connecting members are provided on the external side surface of the camera body, and the two movable connecting members are symmetrically arranged with respect to the lens.

6. The camera module according to claim 1, wherein the fixed bracket comprises a continuous structure, and the movable fitting member in one-to-one correspondence with the movable connecting member is arranged on the continuous structure.

7. The camera module according to claim 1, wherein a plurality of movable connecting members are provided, the fixed bracket comprises bracket parts arranged at intervals, and an arrangement position of the bracket part corresponds to a position of at least one of the plurality of movable connecting members.

8. The camera module according to claim 1, wherein the anti-shake assembly further comprises a feedback module electrically connected with the space attitude sensor, the feedback module comprises a Hall sensor and a controller electrically connected with the Hall sensor, the camera body further comprises a magnetic field generator, and the Hall sensor corresponds to the magnetic field generator in terms of positions.

9. The camera module according to claim 1, wherein the driving module comprises at least one of an electromagnetic force driving assembly and a shape-memory alloy.

10. The camera module according to claim 9, wherein the electromagnetic force driving assembly comprises a driving coil and a magnetic member, the magnetic member is arranged on the camera body, and the driving coil is correspondingly arranged on the fixed bracket.

11. A mobile terminal comprising the camera module according to claim 1, wherein
the lens and the imaging sensor are configured to perform the anti-shake motion relative to the fixed bracket as a whole, thereby reducing influence of change of relative position relationship between the lens and the imaging sensor on the image quality;
the movable connecting member on the external side surface of the camera body is movably connected with the movable fitting member on the fixed bracket, to thereby reduce a structure size and a space occupation of the camera body in a thickness direction.

12. An electronic device, comprising a device body and a camera module, the camera module being assembled to the device body, the camera module comprising:
a fixed bracket assembled and fitted with a fixed member of the device body;
a camera body comprising a lens and an imaging sensor corresponding to the lens in terms of positions, the camera body being further provided with a movable connecting member on an external side surface of the camera body arranged along a circumferential direction of the lens, the fixed bracket being provided with a movable fitting member corresponding to the movable connecting member in terms of positions, the movable fitting member being movably connected with the movable connecting member; and
an anti-shake assembly comprising a space attitude sensor and a driving module electrically connected with the space attitude sensor, the driving module is configured to be fitted with the camera body and to drive the camera body to perform an anti-shake motion relative to the fixed bracket according to shaking information obtained by the space attitude sensor,
wherein the anti-shake motion of the camera body with respect to the fixed bracket indicates a compensation motion in which a posture of the camera body with respect to the fixed bracket is regulated according to the shaking information, so as to maintain a current working position of the camera body in an original working position.

13. The electronic device according to claim 12, wherein one of the movable connecting member and the movable fitting member is a guide wheel, the other one of the movable connecting member and the movable fitting member is an arc-shaped guide rail, an arc center of the arc-shaped guide rail coincides with an optical axis of the lens, and the guide wheel is rollably fitted with the arc-shaped guide rail.

14. The electronic device according to claim 12, wherein one of the movable connecting member and the movable fitting member is a sliding member, the other one of the movable connecting member and the movable fitting member is an arc-shaped slide rail, an arc center of the arc-shaped slide rail coincides with an optical axis of the lens, and the sliding member is slidably fitted with the arc-shaped slide rail.

15. The electronic device according to claim 12, wherein at least two movable connecting members are provided on the external side surface of the camera body.

16. The electronic device according to claim 15, wherein two movable connecting members are provided on the external side surface of the camera body, and the two movable connecting members are symmetrically arranged with respect to the lens.

17. The electronic device according to claim 12, wherein the fixed bracket comprises a continuous structure, and the movable fitting member in one-to-one correspondence with the movable connecting member is arranged on the continuous structure.

18. The electronic device according to claim 12, wherein a plurality of movable connecting members are provided, the fixed bracket comprises bracket parts arranged at intervals, and an arrangement position of the bracket part corresponds to a position of at least one of the plurality of movable connecting members.

19. The electronic device according to claim 12, wherein the anti-shake assembly further comprises a feedback module electrically connected with the space attitude sensor, the feedback module comprises a Hall sensor and a controller electrically connected with the Hall sensor, the camera body further comprises a magnetic field generator, and the Hall sensor corresponds to the magnetic field generator in terms of positions.

20. The electronic device according to claim 12, wherein
the driving module comprises at least one of an electromagnetic force driving assembly and a shape-memory alloy; and
the electromagnetic force driving assembly comprises a driving coil and a magnetic member, the magnetic member is arranged on the camera body, and the driving coil is correspondingly arranged on the fixed bracket.

* * * * *